United States Patent
Itagawa et al.

(10) Patent No.: US 7,658,774 B2
(45) Date of Patent: Feb. 9, 2010

(54) METHOD OF PRODUCING LATTICE BODY FOR LEAD STORAGE BATTERY, AND LEAD STORAGE BATTERY

(75) Inventors: Kazutoshi Itagawa, Toyohashi (JP); Masayoshi Yuki, Toyohashi (JP); Hiroshi Yasuda, Toyohashi (JP); Yoshihiro Murata, Toyohashi (JP)

(73) Assignee: Panasonic Corporation, Osaka (JP)

( * ) Notice: Subject to any disclaimer, the term of this patent is extended or adjusted under 35 U.S.C. 154(b) by 589 days.

(21) Appl. No.: 10/543,699

(22) PCT Filed: Feb. 23, 2004

(86) PCT No.: PCT/JP2004/002094

§ 371 (c)(1),
(2), (4) Date: Jul. 28, 2005

(87) PCT Pub. No.: WO2004/084331

PCT Pub. Date: Sep. 30, 2004

(65) Prior Publication Data

US 2006/0137157 A1    Jun. 29, 2006

(30) Foreign Application Priority Data

Mar. 18, 2003    (JP) ............... 2003-073864

(51) Int. Cl.
H01M 4/82    (2006.01)
H01M 6/00    (2006.01)
H01M 4/00    (2006.01)
H01M 4/02    (2006.01)
B23P 13/00    (2006.01)

(52) U.S. Cl. ............ 29/623.1; 29/623.4; 29/2; 429/122; 429/128; 429/209; 429/66

(58) Field of Classification Search ............ 429/66, 429/122, 128, 209, 242, 245; 29/2, 623.1, 29/623.3–623.4; 136/67
See application file for complete search history.

(56) References Cited

U.S. PATENT DOCUMENTS 4,906,540 A * 3/1990 Hoshihara et al. .......... 429/242

FOREIGN PATENT DOCUMENTS

| DE | 27 21 560 | | 11/1978 |
|---|---|---|---|
| JP | 61-200670 | | 9/1986 |
| JP | 63-237358 | | 10/1988 |
| JP | 05-013084 | | 1/1993 |
| JP | 05013084 | * | 1/1993 |
| JP | 09-115524 | | 5/1997 |
| JP | 2002-100365 | | 4/2002 |
| JP | 2002-324573 | | 11/2002 |
| JP | 2003-338286 | | 11/2003 |
| WO | WO 86/03343 | | 6/1986 |

OTHER PUBLICATIONS

European Search Report issued in European Patent Application No. EP 04713650.0-1227 PCT/JP2004002094, dated May 7, 2008.

* cited by examiner

Primary Examiner—Dah-Wei D Yuan
Assistant Examiner—Claire L Rademaker
(74) Attorney, Agent, or Firm—McDermott Will & Emery LLP

(57) ABSTRACT

A method of producing a grid for a lead-acid battery in accordance with the present invention includes the step of placing lead alloy foil on a base material sheet of a lead-calcium alloy and attaching the lead alloy foil under pressure to the base material sheet. The thickness t of the lead alloy foil, the thickness a of the base material sheet before the attaching, and the thickness b of the composite sheet after the attaching satisfy the relational expression $1.3 \leq (a+t)/b$. The length L of the contact part of rollers with the base material sheet and the lead alloy foil is 10 mm or more.

This makes it possible to secure good adhesion of the lead alloy foil to the base material sheet. Also, when this composite sheet is subjected to an expanding process and used as a positive electrode grid, it is possible to provide a lead-acid battery having excellent cycle life characteristics.

5 Claims, 5 Drawing Sheets

$r_1 < r_2 < r_3 < r_4 < r_5 < r_6$ (a)   (b)       (c)

METHOD OF PRODUCING LATTICE BODY FOR LEAD STORAGE BATTERY, AND LEAD STORAGE BATTERY

This application is a U.S. national phase application of PCT international application PCT/JP2004/002094.

TECHNICAL FIELD

The present invention relates to methods of producing grids for use in lead-acid batteries, and more particularly, to methods of producing composite sheets used in lead-acid battery grids.

BACKGROUND ART

Lead-acid batteries have conventionally been used in various industrial fields, for example, as car batteries and back-up power sources. With respect to lead-acid batteries used in automotive applications, it is required to reduce the amount of self-discharge and the amount of loss of water contained in electrolyte (hereinafter referred to as water loss) for decreasing the number of man-hours needed for repair and maintenance. To meet such requirements, grids used in positive and negative electrodes are made of a lead-calcium alloy, which is free from antimony that increases the amounts of self-discharge and water loss.

Among them, expanded grids obtained by making slits in a rolled sheet of a lead-calcium alloy and expanding the slits have an advantage of high productivity. Also, the addition of tin to a lead-calcium alloy provides high mechanical strength and corrosion resistance required of lead-acid battery grids. Thus, expanded grids made of a Pb—Ca—Sn alloy are widely used.

FIG. 1 shows a production method of a lead-calcium alloy sheet used in a conventional expanded grid. A slab 1, which is a plate-shaped base material and obtained by continuous casting of a lead-calcium alloy, is gradually rolled by a plurality of pairs of rollers 2. At this time, the distance between each pair of rollers in FIG. 1 gradually decreases as the thickness of the slab 1 decreases. That is, the plurality of pairs of rollers are arranged such that the radius ($r_{n+1}$) of the n+1$_{st}$ pair of rollers 2 is greater than the radius ($r_n$) of the n$_{th}$ pair of rollers 2. Also, the center distance between adjoining n$_{th}$ pair of rollers 2 and n+1$_{st}$ pair of rollers 2 is constant. The slab 1 is eventually rolled to a desired thickness, to obtain an alloy sheet 3.

It should be noted that other than the method of FIG. 1, rollers 4 may be arranged such that the center distance between each pair of rollers 4 gradually decreases as the thickness of the slab 1 decreases, while the radius (r) of the rollers 4 is made constant, as illustrated in FIG. 2.

Thereafter, slits are cut in the alloy sheet 3, and the slits are expanded to obtain an expanded grid having meshes. An active material paste is filled into the meshes of the expanded grid, and the resultant grid is cut to obtain an electrode plate for a lead-acid battery.

As described above, when electrode plates including an expanded grid made of a lead-calcium alloy are used as positive and negative electrodes, there is an advantage that the amounts of self-discharge and water loss of the resultant lead-acid battery are small, in comparison with the cases of including a positive electrode grid made of a lead-antimony alloy. However, there is also a drawback of poor cycle life characteristics in repeating charging and discharging.

As a method for improving the cycle life characteristics, Japanese Laid-Open Patent Publication No. Sho 61-200670 proposes placing a lead alloy sheet containing one or both of tin and antimony on a base material sheet of a lead-calcium alloy, and rolling these two sheets for integration to obtain a composite sheet. Since tin or antimony contained in the composite sheet has the effect of improving the adhesion of the positive electrode active material to the positive electrode grid, the cycle life characteristics are improved.

In improving the adhesion of the positive electrode active material to the positive electrode grid containing tin or antimony, it is important that the base material sheet and the lead alloy sheet have good adhesion. In the next step, the composite sheet is expanded in an expanding process and therefore undergoes plastic deformation. In this step, if the adhesion of the lead alloy sheet to the base material sheet is not good, tiny cracks tend to occur between the base material sheet and the lead alloy sheet. The occurrence of the cracks significantly impairs the adhesion of the positive electrode active material to the positive electrode grid, resulting in a decrease in cycle life characteristics.

As a method for improving the adhesion of the lead alloy sheet to the base material sheet, Japanese Laid-Open Patent Publication No. Hei 5-13084, for example, proposes making the temperature difference between the base material slab and the lead alloy foil attached to this slab 150° C. or less. Also, as a method of obtaining such temperature difference, there is a proposal of cooling the slab surface with water.

In this way, by regulating the temperature difference between the slab and the lead alloy foil, it is possible to suppress, to some extent, the separation of the lead alloy foil which occurs when the composite sheet consisting of the slab and the lead alloy foil is bent. However, completely preventing the occurrence of such separation is still difficult. Further, even if the separation of the lead alloy foil is not found by the visual inspection of the composite sheet, a lead-acid battery including this composite sheet as the positive electrode grid may not exhibit expected cycle life characteristics. In this case, it is considered that there is such minute separation between the base material sheet and the lead alloy sheet that cannot be found by visual inspection.

In view of the above problems, it is therefore an object of the present invention to provide a method for producing a lead-acid battery grid formed from a composite sheet, which has excellent adhesion between a base material sheet of a lead-calcium alloy and lead alloy foil containing a component effective for improving cycle life characteristics. It is another object to provide a lead-acid battery having good cycle life characteristics by using this composite sheet, which has been subjected to an expanding process, as a positive electrode grid.

DISCLOSURE OF INVENTION

A method of producing a grid for a lead-acid battery in accordance with the present invention includes the steps of: (1) passing lead alloy foil together with a base material sheet of a lead-calcium alloy between a pair of rollers to attach the lead alloy foil to the base material sheet, to make a composite sheet, and (2) passing the composite sheet between a plurality of pairs of rollers to gradually roll the composite sheet to a predetermined thickness. The thickness t of the lead alloy foil, the thickness a of the base material sheet, and the thickness b of the composite sheet in the step (1) satisfy the relational expression: $1.3 \leq (a+t)/b$. The length of the contact part of the rollers of the step (1) with the base material sheet and the lead alloy foil is 10 mm or more in the longitudinal direction of the base material sheet.

It is preferable that the temperature difference between the base material sheet and the lead alloy foil be 50° C. or less in the step (1).

It is preferable that the lead alloy foil includes a lead alloy containing at least one selected from the group consisting of Sn, Sb and Ag.

It is preferable that the method further includes the step (3) of subjecting the composite sheet to an expanding process after the step (2).

Also, the present invention relates to a lead-acid battery using a lead-acid battery grid obtained by the above-described production method as at least a positive electrode grid.

BEST MODE FOR CARRYING OUT THE INVENTION

Figure 1:
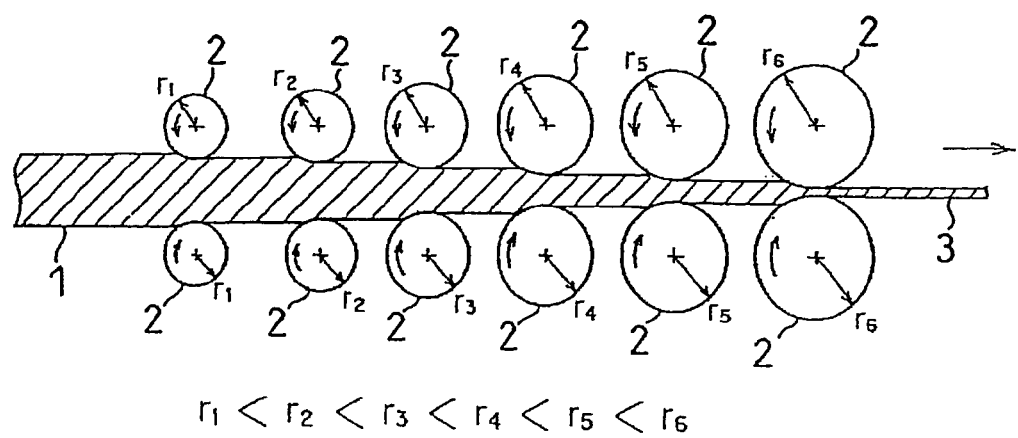
FIG. 1 is a drawing showing a conventional process of rolling a slab.
Figure 2:
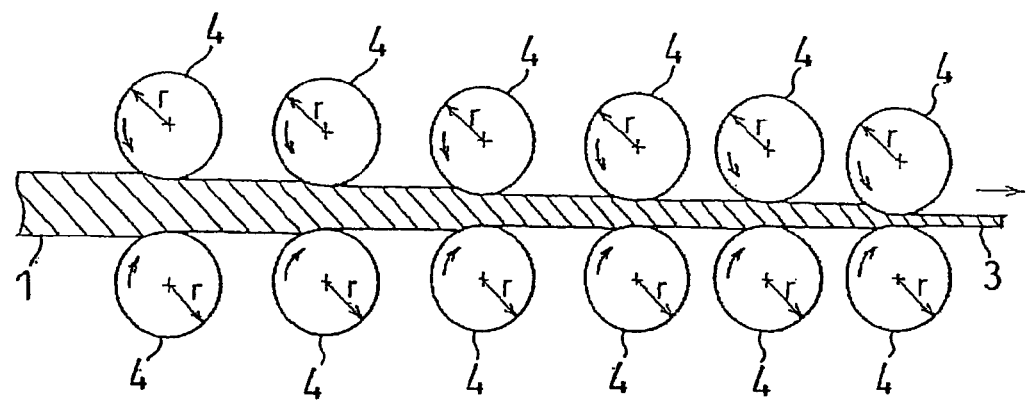
FIG. 2 is a drawing showing another conventional process of rolling a slab.
Figure 3:
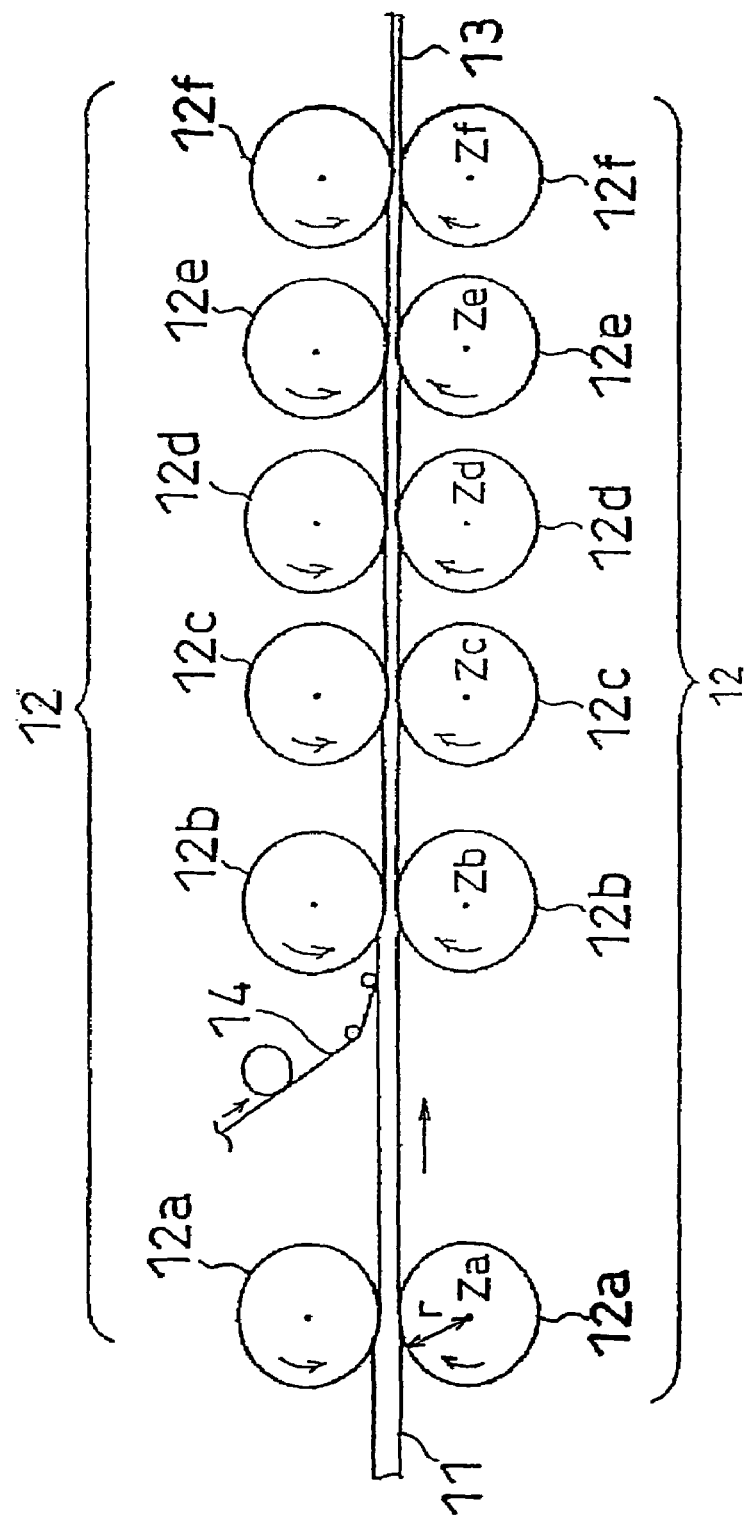
FIG. 3 is a drawing showing a production process of a composite sheet in accordance with a method of producing a grid for a lead-acid battery of the present invention.

Referring now to FIG. 3, embodiments of the present invention are described. FIG. 3 shows a production process of a composite sheet in accordance with a method of producing a grid for a lead-acid battery of the present invention.

In a rolling process of a lead alloy sheet used in a grid, six pairs of rollers 12 are provided. These pairs of rollers have the same size (radius) and are arranged such that the center distance between each pair of rollers decreases as the thickness of a base material sheet decreases. Also, the rollers in each pair are arranged such that the center distance between adjacent pairs of rollers is equal in the longitudinal direction of the base material sheet.

First, a slab 11 of a lead-calcium alloy is passed, as a base material sheet, between the first pair of rollers 12a. The slab 11 is obtained, for example, by a method of continuously casting a molten lead alloy containing a predetermined concentration of calcium, or by a method of pulling out this molten lead alloy from the slit which has a predetermined size and is formed in the tip end of a nozzle. The thickness of the slab 11 is generally around 10 to 20 mm.

In order to secure the mechanical strength of the base material sheet and the lead-acid battery grid formed from this sheet, the base material sheet is preferably a lead alloy containing 0.03 to 0.10% by mass of calcium.

Further, in order to secure the corrosion resistance as well as the mechanical strength of the lead-acid battery grid formed from the base material sheet, the base material sheet is preferably made of a Pb—Ca—Sn alloy. Also, the Pb—Ca—Sn alloy preferably contains 0.03 to 0.10% by mass of Ca and 0.80 to 1.80% by mass of Sn.

It should be noted that the lead alloy of the base material sheet is substantially free from antimony, for the purpose of reducing the amounts of water loss and self-discharge. However, the lead alloy may contain, as an impurity, about 0.001 to 0.002% by mass of antimony, which is an amount that will not have a bad effect on the amounts of water loss and self-discharge. Further, the lead alloy may contain, as an impurity, about 0.001 to 0.01% by mass of bismuth, about 0.005 to 0.02% by mass of aluminum, or about 0.001 to 0.08% by mass of barium, which is an amount that will not have a bad effect on the battery characteristics.

Next, lead alloy foil 14 is placed on the surface of the slab 11 before the slab 11 is fed between the second pair of rollers 12b, and the lead alloy foil 14 and the slab 11 are fed together between the second pair of rollers 12b. Then, the slab 11 and the lead alloy foil 14 are simultaneously rolled by the rollers 12b, so that the lead foil 14 is attached under pressure to the slab 11 and a composite sheet is obtained (step (1)). For example, the obtained composite sheet may be subjected to an expanding process to form a grid, as described above.

The lead alloy foil 14 is preferably made of a lead alloy containing at least one selected from the group consisting of Sn, Sb and Ag. More preferably, the lead alloy 14 is made of a lead alloy containing at least one selected from the group consisting of 1 to 10% by mass of Sn, 1 to 10% by mass of Sb, and 0.05 to 1.0% by mass of Ag. When a composite sheet including the lead alloy foil 14 of such composition is used as a positive electrode grid, the cycle life characteristics of the resultant lead-acid battery are improved. The thickness t of the lead alloy foil 14 is preferably about 0.05 to 0.30 mm.

Also, when the lead alloy foil 14 is attached under pressure to the slab 11, the temperature difference between them is preferably 50 or less. This further improves the adhesion of the lead alloy foil 14 to the slab 11. This temperature difference is controlled, for example, by making the temperature of the lead alloy foil the same as room temperature and adjusting the temperature of the slab, obtained by continuous casting, by water cooling.

Also, the rollers are heated by the heat generated by the rolling of the slab. If the temperature of the rollers increases excessively, lead adheres to the surfaces of the rollers, impairing the smoothness of the slab surface. To address this problem, for example, the temperature of the surfaces of the rollers can be controlled at about 80 to 90° C. by a method of spraying a dispersion of rust-inhibiting oil on the rollers.

Figure 4:
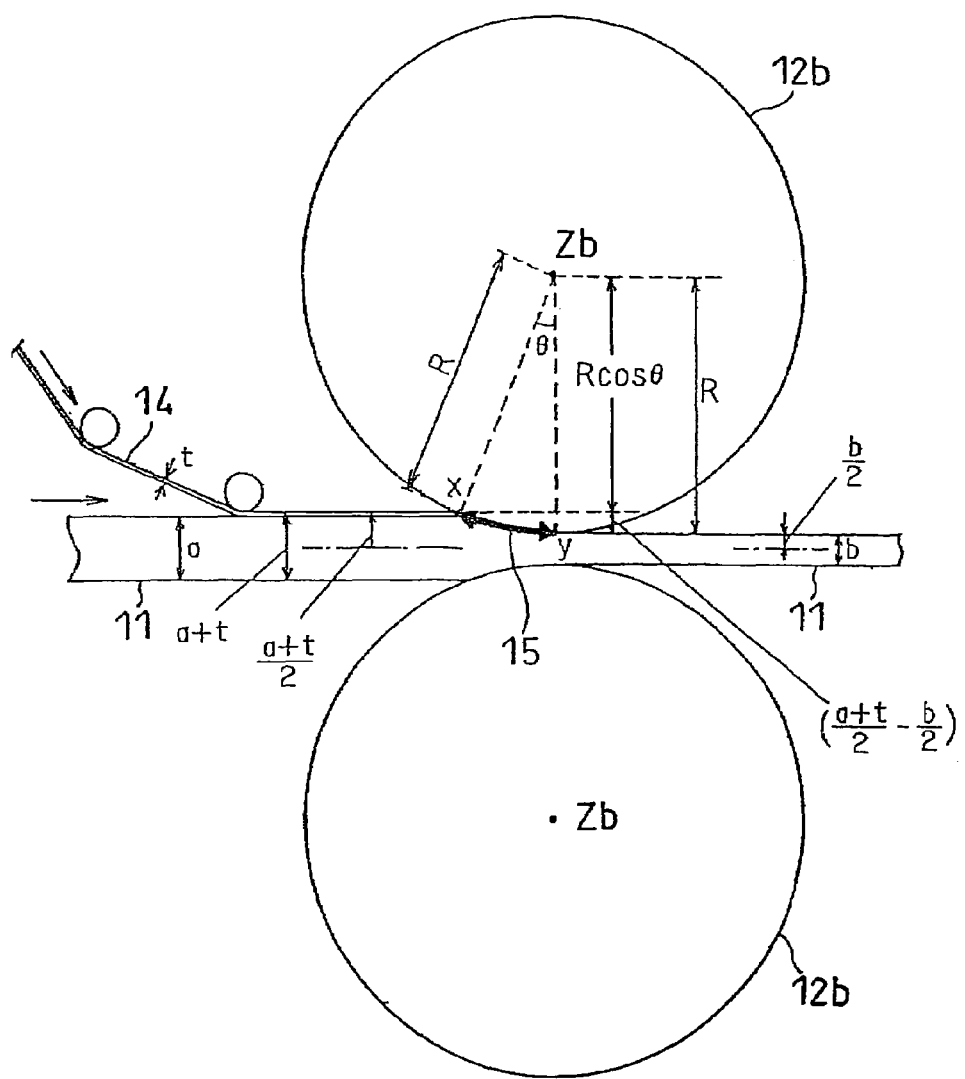
FIG. 4 is a drawing showing the main part of the production process of a composite sheet in accordance with the method of producing a grid for a lead-acid battery of the present invention.

FIG. 4 is an enlarged drawing of a part of FIG. 3, at which the lead alloy foil 14 is attached to the slab 11. At the second rollers to which the lead alloy foil 14 is fed, the thickness a of the slab 11 immediately before the rolling, the thickness b of the composite sheet immediately after the rolling, and the thickness t of the lead alloy foil 14 satisfy the following expression (1):

$$1.3 \leq (a+t)/b \tag{1}$$

Further, a contact part 15 of each of the rollers 12b with the lead alloy foil 14 placed on the slab 11 has a length L of 10.0 mm or more in the longitudinal direction of the slab.

The length L is given by the expression (2), using the radius r of the reduction roller 12b and the angle θ (radian), which a straight line x-z forms with a straight line y-z at the central axis z of the reduction roller 12b, when the opposite ends of the contact part 15 are represent by x and y respectively.

$$L = \theta r \tag{2}$$

Also, the radius r is given by the following expression (3), using the thickness a of the slab, the thickness b of the composite sheet, the thickness t of the lead alloy foil, and the angle θ.

$$r = \{(a+t)/2\} - (b/2)\} + r \cos \theta \tag{3}$$

And, θ is given by the following expression (4) by modifying the expression (3).

$$\theta = \cos^{-1}[1-\{(a+t-b)/2r\}] \quad (4)$$

Accordingly, from the expressions (2) and (3), the length (L) is given by the following expression (5).

$$L = r \cdot \cos^{-1}[1-\{(a+t-b)/2r\}] \quad (5)$$

That is, r, a, t and b satisfying the length L of 10.0 mm or more, and the above expressions (1) and (5) may be determined.

Thereafter, the composite sheet is gradually rolled by the third and subsequent pairs of rollers 12 (12c, 12d, 12e, and 12f), and a composite sheet 13 having a desired thickness is obtained (step (2)). The thickness of the rolled composite sheet 13 may be determined according to the battery design, but it is generally about 0.5 to 1.5 mm.

The composite sheet obtained by the above method has good adhesion, and the occurrence of separation of the lead alloy foil 14 from the slab 11 is suppressed.

Further, when the rolled composite sheet 13 is subjected to an expanding process and used as a positive electrode grid, it is possible to obtain a lead-acid battery of the present invention in the conventional manner. In the lead-acid battery of the present invention, the lead alloy layer, containing antimony, tin, or silver and formed on the surface of the positive electrode grid, adheres firmly to the base material layer. Therefore, the positive electrode active material and the positive electrode grid have good adhesion, so that the cycle life characteristics can be significantly improved.

Although this embodiment has described a process of feeding lead alloy foil to the second pair of six pairs of rollers, the number of pairs of rollers and the pair of rollers to which the lead alloy foil is fed are not particularly limited to these.

In the following, examples of the present invention are described in detail.

EXAMPLE (1) Production of Positive Electrode Plate

First, a composite sheet was produced by the same procedure as that explained with reference to FIG. 3.

A slab 11, which was obtained by continuous casting of a molten Pb—Ca—Sn alloy containing 0.07% by mass of Ca and 1.2% by mass of Sn, was used as a base material sheet. The thickness a of the slab 11 before the rolling by rollers 12b was 11.0 mm. A Pb—Sn—Sb alloy containing 5.0% by mass of Sn and 5.0% by mass of Sb was used as lead alloy foil 14. The thickness t of the lead alloy foil 14 before the rolling was 0.20 mm. The thickness of a composite sheet 13 obtained as the result of this rolling process was 1.1 mm.

Figure 5:
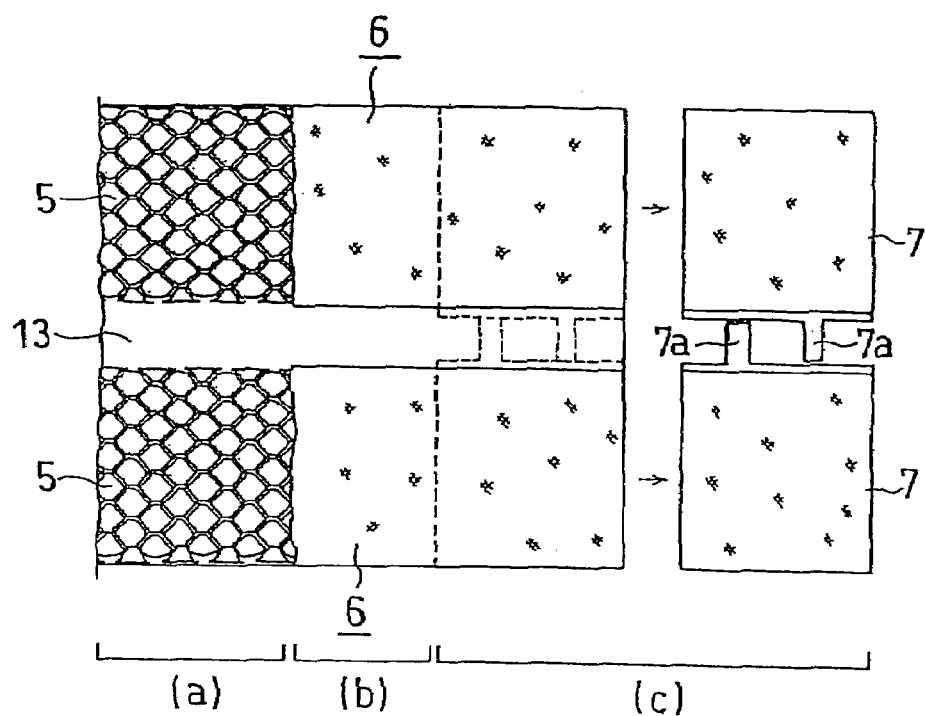
FIG. 5 is a drawing showing a process of obtaining an electrode plate from the composite sheet.

Subsequently, predetermined slits were cut in the rolled composite sheet 13, and then, the slits were expanded to form meshes 5 ((a) of FIG. 5), so as to obtain an expanded grid (expanding process). It should be noted that this expanding process was not applied to the central part of the composite sheet 13, since a tab 7a, given below, is formed on this part. A positive electrode paste 6 was filled into the meshes 5 ((b) of FIG. 5), and the resultant grid was cut into the form of an electrode plate having the tab 7a ((c) of FIG. 5), so as to obtain an electrode plate 7. Thereafter, the electrode plate 7 was cured and dried, so as to obtain an unformed positive electrode plate 21.

The positive electrode paste used was prepared by adding water and sulfuric acid to a lead powder including 10 to 30% by mass of lead oxide and 90 to 70% by mass of metallic lead and kneading the mixture.

(2) Production of Negative Electrode Plate

A slab, obtained by continuous casting of a molten Pb—Ca alloy containing 0.07% by mass of Ca, was rolled to obtain a rolled sheet. Then, in the same manner as the positive electrode plate, the rolled sheet was subjected to an expanding process, filled with a negative electrode paste, and cut into the form of an electrode plate, so as to obtain an electrode plate. Thereafter, the electrode plate was cured and dried to obtain an unformed negative electrode plate 22.

The negative electrode paste used was prepared by adding water and sulfuric acid to a lead powder including 10 to 30% by mass of lead oxide and 90 to 70% by mass of metallic lead and kneading the mixture.

(3) Fabrication of Lead-acid Battery

Figure 6:
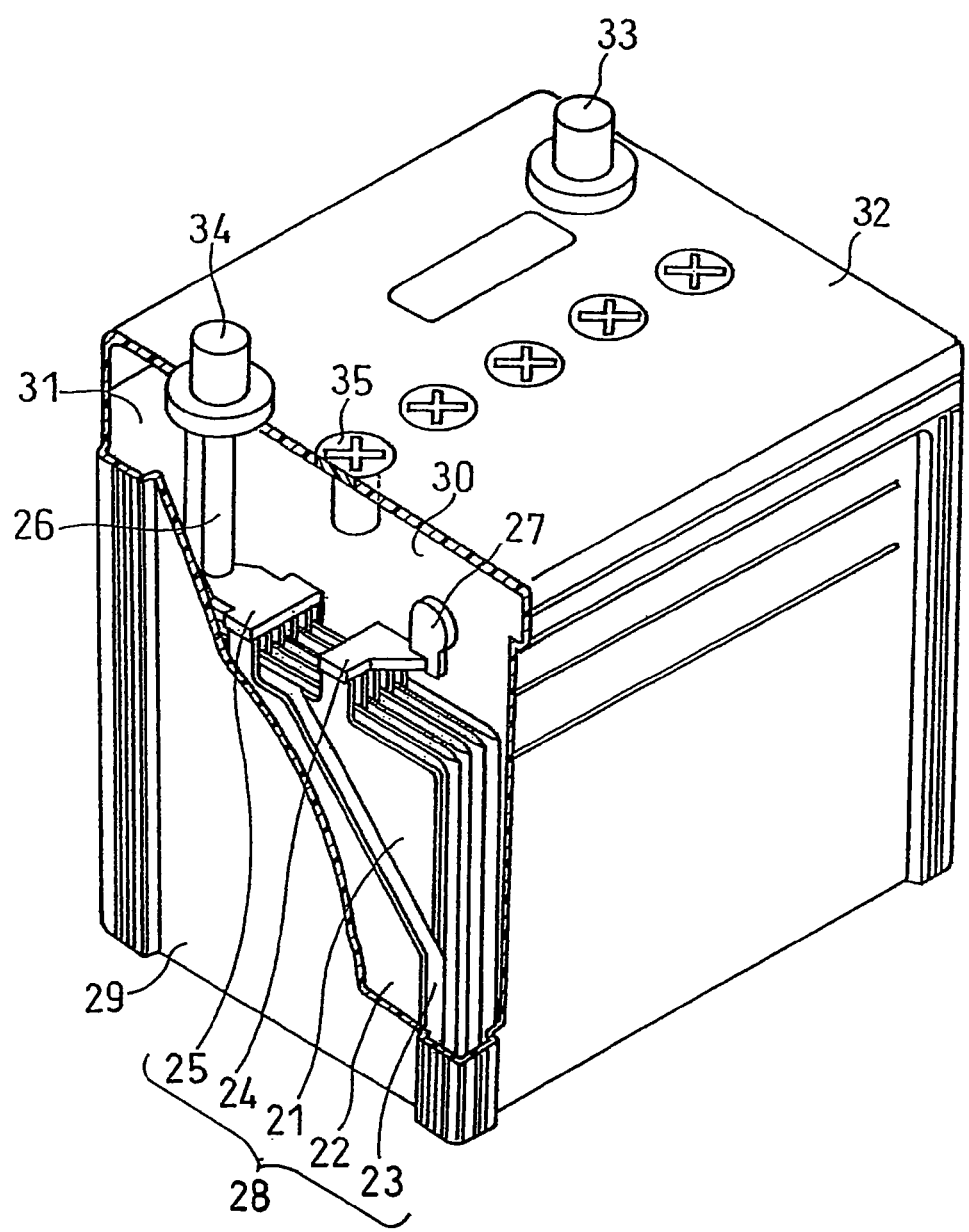
FIG. 6 is a perspective view, partially cut away, of a lead-acid battery in accordance with the present invention.

A lead-acid battery having the structure as illustrated in FIG. 6 was produced by the following manner. FIG. 6 is a perspective view, partially cut away, of the lead-acid battery.

The positive electrode plates 21 and the negative electrode plates 22 obtained in the above manner were stacked with separators 23 interposed therebetween. Straps 24 and 25 were formed by welding together the tabs of the electrode plates of the same polarity, so as to obtain a plate pack 28. The plate pack 28 was accommodated in each of a plurality of cell compartments 31 divided by partitions 30 of a container 29, and adjoining plate packs 28 were connected in series by a connector 27 adjacent to and connected to the strap 24. In this example, the connection between the electrode groups was made via a through-hole (not shown) formed in the partition 30.

With respect to the plate packs 28 located at opposite ends of the series connection, one of them was provided with a positive pole (not shown), and the other was provided with a negative pole 26. While a cover 32 was fitted to the opening of the container 29, a positive electrode terminal 33 and a negative electrode terminal 34 of the cover 32 were welded to the positive pole and the negative pole 26. Thereafter, dilute sulfuric acid was injected into the cell compartments from the liquid inlets formed in the cover 32, to perform charging. After the charging, a vent cap 35 was fitted to each liquid inlet, to produce a lead-acid battery for starting (hereinafter referred to as battery) of 55D23 defined by JIS D 5301.

The length L of the contact part of the reduction roller with the base material sheet and the lead alloy foil, as well as the value of (a+t)/b, were varied, as shown in Table 1, by changing the center distance between the second pair of rollers 12b and the radius r thereof in the above-described production process of the composite sheet. Also, the temperature difference between the slab and the lead alloy foil was varied, as shown in Table 1, by keeping the temperature of the lead alloy foil 20' and adjusting the temperature of the slab by water cooling.

It should be noted that the radius r of the rollers 12a and 12c to 12f, excluding the second pair of the process as illustrated in FIG. 4, was 85 mm. The center distance between the first pair of rollers was made 180.4 mm, and the center distance between the third to sixth pairs of rollers 12c to 12f was determined such that the amount of thick reduction by the rolling become constant. In Table 1, batteries 5, 6, 8, 10, 12 to 15, 17, and 18 are Examples of the present invention, and batteries 1 to 4, 7, 9, 11, and 16 are Comparative Examples.

TABLE 1

| Battery No. | (a + t)/b | Length L (mm) | Temperature difference (° C.) | Life cycle |
|---|---|---|---|---|
| Battery 1 | 1.20 | 8 | 20 | 105 |
| Battery 2 | 1.20 | 10 | 20 | 105 |
| Battery 3 | 1.20 | 20 | 20 | 110 |
| Battery 4 | 1.30 | 8 | 20 | 100 |
| Battery 5 | 1.30 | 10 | 20 | 140 |
| Battery 6 | 1.30 | 20 | 20 | 145 |
| Battery 7 | 1.30 | 8 | 50 | 90 |
| Battery 8 | 1.30 | 10 | 50 | 140 |
| Battery 9 | 1.30 | 8 | 60 | 80 |
| Battery 10 | 1.30 | 10 | 60 | 130 |
| Battery 11 | 1.60 | 8 | 20 | 90 |
| Battery 12 | 1.60 | 10 | 20 | 150 |
| Battery 13 | 1.60 | 10 | 50 | 150 |
| Battery 14 | 1.60 | 10 | 60 | 135 |
| Battery 15 | 1.60 | 20 | 20 | 150 |
| Battery 16 | 2.00 | 8 | 20 | 80 |
| Battery 17 | 2.00 | 10 | 20 | 135 |
| Battery 18 | 2.00 | 20 | 20 | 140 |

[Evaluation of Cycle Life Characteristics]

Batteries 1 to 18 listed in Table 1 were subjected to a low load life test (JIS D5301) under the following conditions.

The batteries were charged at a maximum current of 25 A and a constant voltage of 14.8 V for 10 minutes, and then discharged at a constant current of 25 A for 4 minutes. This cycle was repeated. Every 480 cycles of such charging and discharging, the batteries were discharged at a constant current of 356 A for 30 seconds. When the discharge voltage at the 30th second lowered to 7.2 V, the batteries were judged as having reached the end of their life.

These results are shown in Table 1. The cycle life in Table 1 is an index obtained by defining the cycle number at which the battery 4 reached the end of its life as 100.

As a result, it was found that the batteries of Examples had better cycle life characteristics than the batteries of Comparative Examples. Also, when the temperature difference between the slab and the lead alloy foil was 20 to 60° C., excellent cycle life characteristics were obtained. However, when the temperature difference was 60° C., the cycle life characteristics were slightly lower than when the difference was 20° C. and 50° C. It is therefore preferable that the temperature difference be 50° C. or less.

Next, the respective batteries were decomposed and examined after the life tests. The batteries of Examples exhibited remarkable softening of the positive electrode active material, and it was found that these batteries reached the end of their life because of the deterioration of the active material itself. On the other hand, with the batteries of Comparative Examples, partial separation of the lead alloy foil from the positive electrode grid was observed. Also, a large amount of positive electrode active material shed from the positive electrode grid, although the softening of the positive electrode active material was not so remarkable in comparison with the batteries of Examples.

From these results, it is considered that the batteries of Comparative Examples reached the end of their life because the minute separation of the lead alloy foil from the positive electrode grid caused a decrease in the interfacial adhesion of the positive electrode active material to the positive electrode grid. By contrast, according to the present invention, it is thought that the cycle life characteristics were significantly improved because the positive electrode active material and the positive electrode grid had good interfacial adhesion.

In this example, an expanded grid was used as the negative electrode grid, but the same effects as described above can be obtained by using a casting grid, which is obtained by injecting a molten lead into a mold and solidifying it.

INDUSTRIAL APPLICABILITY

As described above, in a production process of a composite sheet in which lead alloy foil, which is effective for improving cycle life characteristics, is attached under pressure to a base material sheet of a lead-calcium alloy, the present invention can provide a method of producing a grid for a lead-acid battery, by which good adhesion of the lead alloy foil to the base material sheet is secured. When this composite sheet is subjected to an expanding process and used as a positive electrode grid, it is possible to provide a lead-acid battery having good cycle life characteristics.

The invention claimed is:

1. A method of producing a grid for a lead-acid battery, comprising the steps of:
   (1) passing lead alloy foil together with a base material sheet of a lead-calcium alloy between a pair of rollers to attach the lead alloy foil to the base material sheet, to make a composite sheet, and
   (2) passing the composite sheet between a plurality of pairs of rollers to gradually roll said composite sheet to a predetermined thickness after said step (1),
   wherein the thickness t (mm) of the lead alloy foil, the thickness a (mm) of the base material sheet, the thickness b (mm) of the composite sheet before said step (2), and the radius r (mm) of the roller in said step (1) satisfy the relational expressions:

$1.3 \leq (a+t)/b$, and $10 \leq r\cos^{-1}[1-\{(a+t-b)/2r\}]$.

2. The method of producing a grid for a lead-acid battery in accordance with claim 1, wherein the temperature difference between the base material sheet and the lead alloy foil is 50° C. or less in said step (1).

3. The method of producing a grid for a lead-acid battery in accordance with claims 1 or 2, wherein the lead alloy foil comprises a lead alloy containing at least one selected from the group consisting of Sn, Sb and Ag.

4. The method of producing a grid for a lead-acid battery in accordance with claim 1, further comprising the step (3) of subjecting the composite sheet to an expanding process after said step (2).

5. A lead-acid battery using a lead-acid battery grid obtained by the production method of claim 4 as at least a positive electrode grid.

* * * * *